UNITED STATES PATENT OFFICE.

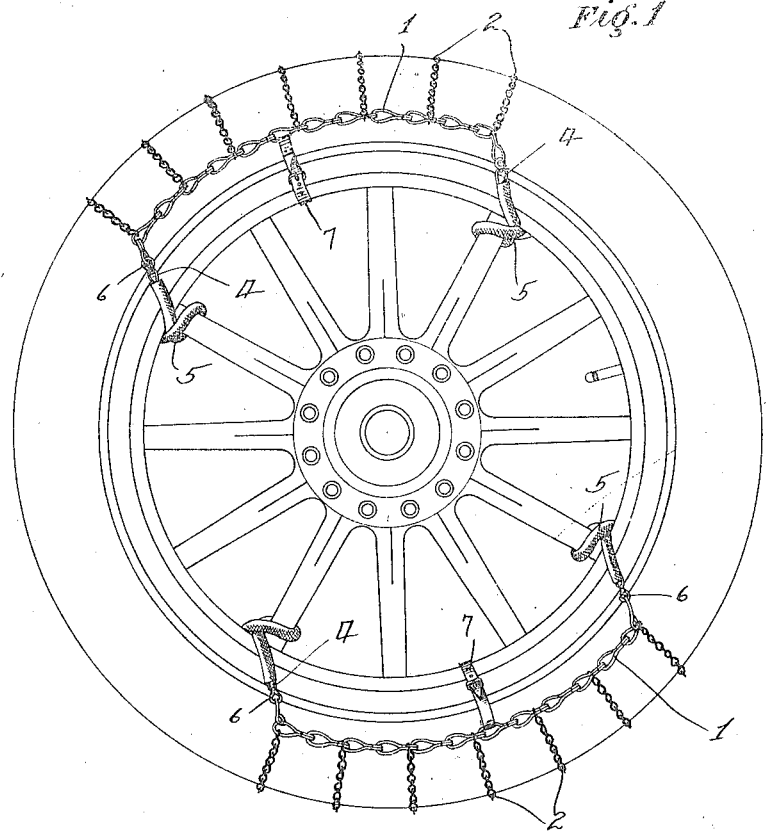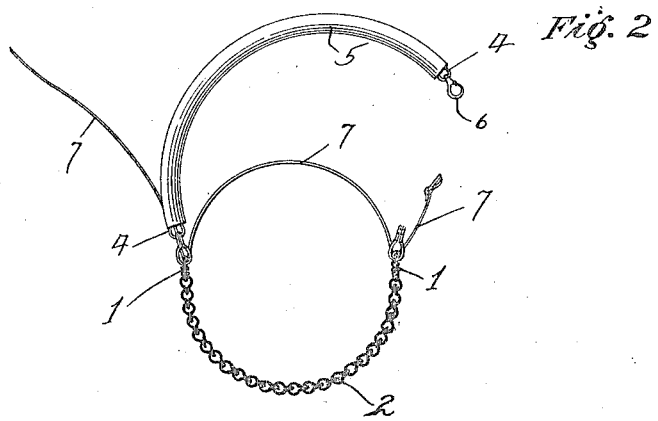

VIRGIL L. BOWMAN, OF ALAMEDA, CALIFORNIA.

ANTISKID DEVICE.

1,184,717. Specification of Letters Patent. Patented May 30, 1916.

Application filed April 21, 1914. Serial No. 833,335.

*To all whom it may concern:*

Be it known that I, VIRGIL L. BOWMAN, a citizen of the United States, residing at Alameda, in the county of Alameda and State of California, have invented certain new and useful Improvements in Antiskid Devices, of which the following is a specification.

This invention relates to improvements in anti-skid devices and more particularly to the type employing short length of chains disposed across the tread of the tire.

The principal object of my invention is to provide an improved device of the character named, which may be readily applied to the tire, when the latter is resting on the ground, as when the lower portion of the wheel is immersed in snow, water or sand, and under these conditions the usual form of endless skid devices cannot be applied. My device, however, may be applied to the upper portion of the wheel only, and when power is applied thereto it is brought around to the portion resting on the ground where it takes hold and in cases of bad slippage two or more of the devices may be applied to the wheel.

Another object of my invention is to provide a device, which is connected firmly to the wheel so that there is no chance of the tire slipping within the anti-skid device as sometimes happens when they are loosely applied around the periphery of the tire.

With these and other objects in view my invention consists in the novel construction and combination of elements as herein described and specifically pointed out in the appended claim.

Reference should be had to the accompanying drawing forming a part of this specification wherein—

Figure 1 is a view in elevation of a wheel showing my improved anti-skid device attached thereto. Fig. 2 is a view in end elevation of the improved device.

Referring to corresponding parts by the same numerals of reference in the several views, 1 denotes short lengths of chains disposed in parallel segmental relation along the sides of the tire. Connecting these two chains at suitable intervals is a plurality of short cross chains 2, disposed across the tread of the tire and the device thus formed is rigidly attached to the wheel by means of straps or other flexible members.

As illustrated in the drawings the ends of the chains 1 are connected by means of a chain 4 over which is fitted a sleeve of soft material 5 to prevent chafing the felly and spoke of the wheel. This chain is given a wrap around the said spoke in order to prevent slipping of the device sidewise on the tire, and in order to permit fastening I provide on one end of chains 4 snap buckles 6, which are hooked into the end links of side chains 1. In order to more rigidly fasten the device to the tire I provide at intervals an ordinary leather strap as shown at 7, which strap passes from one side to the other through the links of the side chains 1.

It will be apparent that in use if the lower portion of the wheel is immersed in mud, snow, or other material which causes slipping, that one of these devices may be conveniently applied on the top portion of the tread and moved around with the wheel until contact with the ground. If one is insufficient to give traction then as many additional devices as required may be applied.

I claim:

A device of the character described comprising spaced apart segmental lengths of chain in parallel relation, a plurality of cross chains joining said segmental lengths and positioned to extend transversely across the tread of a tire, flexible members for connecting the opposite extremities of said segmental lengths at each end thereof, each of said flexible members being positioned to extend transversely across the felly of a wheel, and of a sufficient length to permit the same to encircle a spoke of said wheel, said flexible members and said segmental members having complemental devices for detachable engagement, and flexible devices positioned to extend transversely across the said felly and passed through intermediate links of said chains.

In testimony whereof I affix my signature in presence of two witnesses.

VIRGIL L. BOWMAN.

Witnesses:
W. A. STOCK,
S. GIBBEL.